(No Model.)
J. WILSON.
APPARATUS FOR MANUFACTURING LAMP BLACK.
No. 346,973. Patented Aug. 10, 1886.
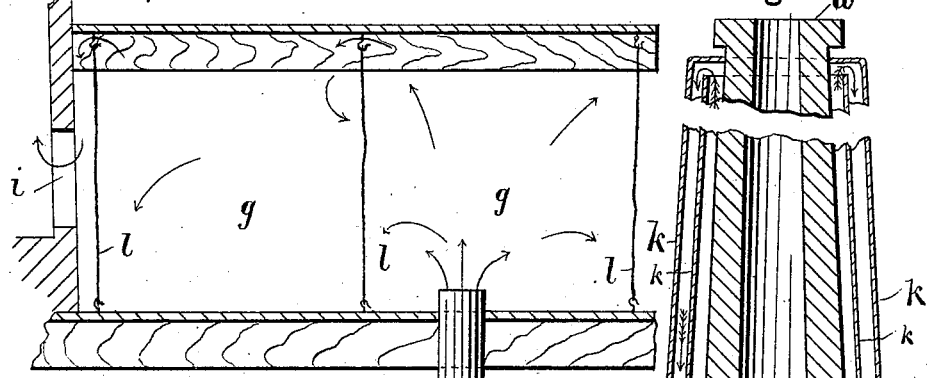
Fig. 1.
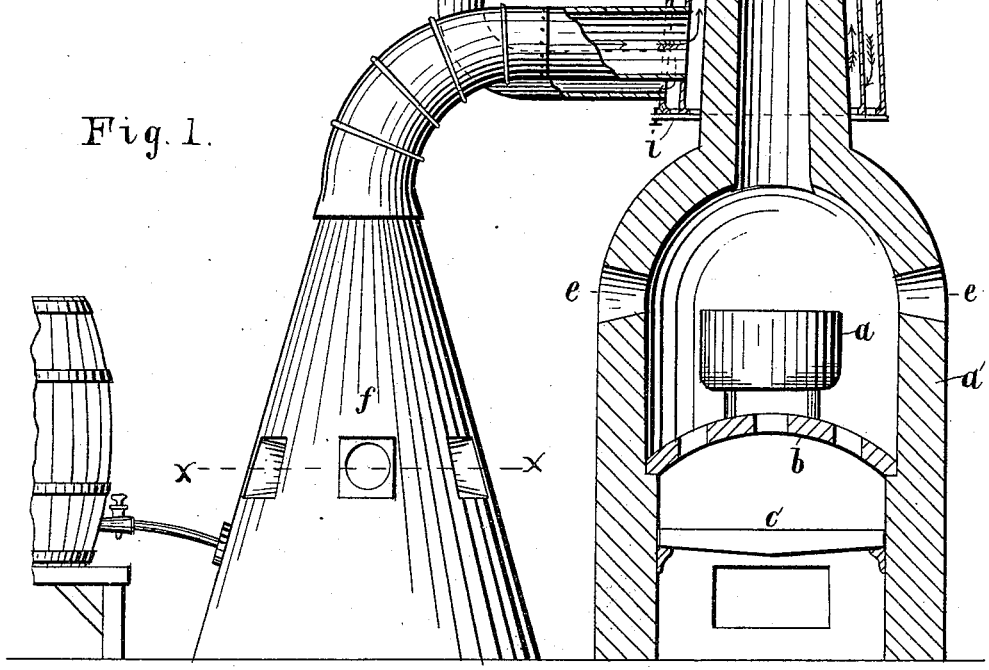
Fig. 2.
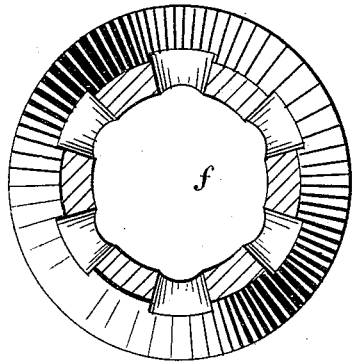
Witnesses.
Jos. S. Lockwood.
W. Morgan.
Inventor.
John Wilson.
By A. P. Thayer, Atty.

UNITED STATES PATENT OFFICE.

JOHN WILSON, OF NEW YORK, N. Y.

APPARATUS FOR MANUFACTURING LAMP-BLACK.

SPECIFICATION forming part of Letters Patent No. 346,973, dated August 10, 1886.

Application filed November 2, 1885. Serial No. 181,558. (No model.)

*To all whom it may concern:*

Be it known that I, JOHN WILSON, a citizen of the United States, residing at New York city, in the county and State of New York, have invented new and useful Improvements in Appliances for Utilizing the Waste Products of Glass-Furnaces, of which the following is a specification.

My invention consists of an appliance for glass-furnaces, whereby the waste products of the fuel employed in the annealing and tempering furnaces, which is the same as is employed for the manufacture of lamp-black, may be utilized for the latter purpose as effectually as when consumed solely therefor, and thus the cost of the lamp-black may be greatly cheapened, as hereinafter fully described, reference being made to the accompanying drawings, in which—

Figure 1 is a sectional elevation of the ordinary glass-melting furnace, and sectional elevation of the annealing or tempering furnace, with my appliance for condensing the carbonaceous products and collecting the particles of lamp-black. Fig. 2 is a horizontal section of the tempering-furnace, in which the lamp-black-producing fuel is burned.

In the manufacture of articles of glass the materials for producing the glass are first melted in the clay pot $a$ in furnace $a'$, and resting upon the arched grid $b$ over the grate $c$, whereon bituminous or cannel coal is used for fuel, the products of combustion escaping through the chimney $d$. The glass is removed by the blowing-pipe through the openings $e$, and wrought into articles of nearly complete form, but of a hard and brittle nature. The articles are then put into the tempering-furnace $f$, where they are reheated with flame produced by the combustion of oil, tar, rosin, or their compounds, the flue of the furnace being connected with chimney $d$, or otherwise arranged so that the products of the combustion are discharged into the air richly laden with valuable lamp-black, which is lost. Instead of thus allowing this waste, I propose to combine the usual collecting-chambers, $g$, such as are employed in special apparatus for producing lamp-black, with the tempering-furnace $f$, so as to discharge directly into said chambers, or first, and preferably, into jackets $k$, surrounding the chimney, and thence into said chambers, instead of into the air, and thus collect the lamp-black as effectually as when the fuel is purposely burned therefor. From the collecting-chambers the uncondensable gases escape through the flue $i$, which may discharge into the atmosphere or into chimney $d$, as preferred. The condensing-chambers may also be connected with the furnace $a'$, in case fuel of the kind employed in the tempering-furnace be available in it.

From the jackets $k$ the lamp-black may be removed through openings $i$ at the bottom, closed by doors or slides.

The chambers $g$ may have canvas partitions and sides $l$, to collect and readily detach the lamp-black.

What I claim, and desire to secure by Letters Patent, is—

The combination, in one and the same apparatus, of a glass-tempering furnace and a lamp-black-collecting chamber, substantially as described.

In witness whereof I have hereunto signed my name in the presence of two subscribing witnesses.

JOHN WILSON.

Witnesses:
W. J. MORGAN,
S. H. MORGAN.